Figures 1, 2:
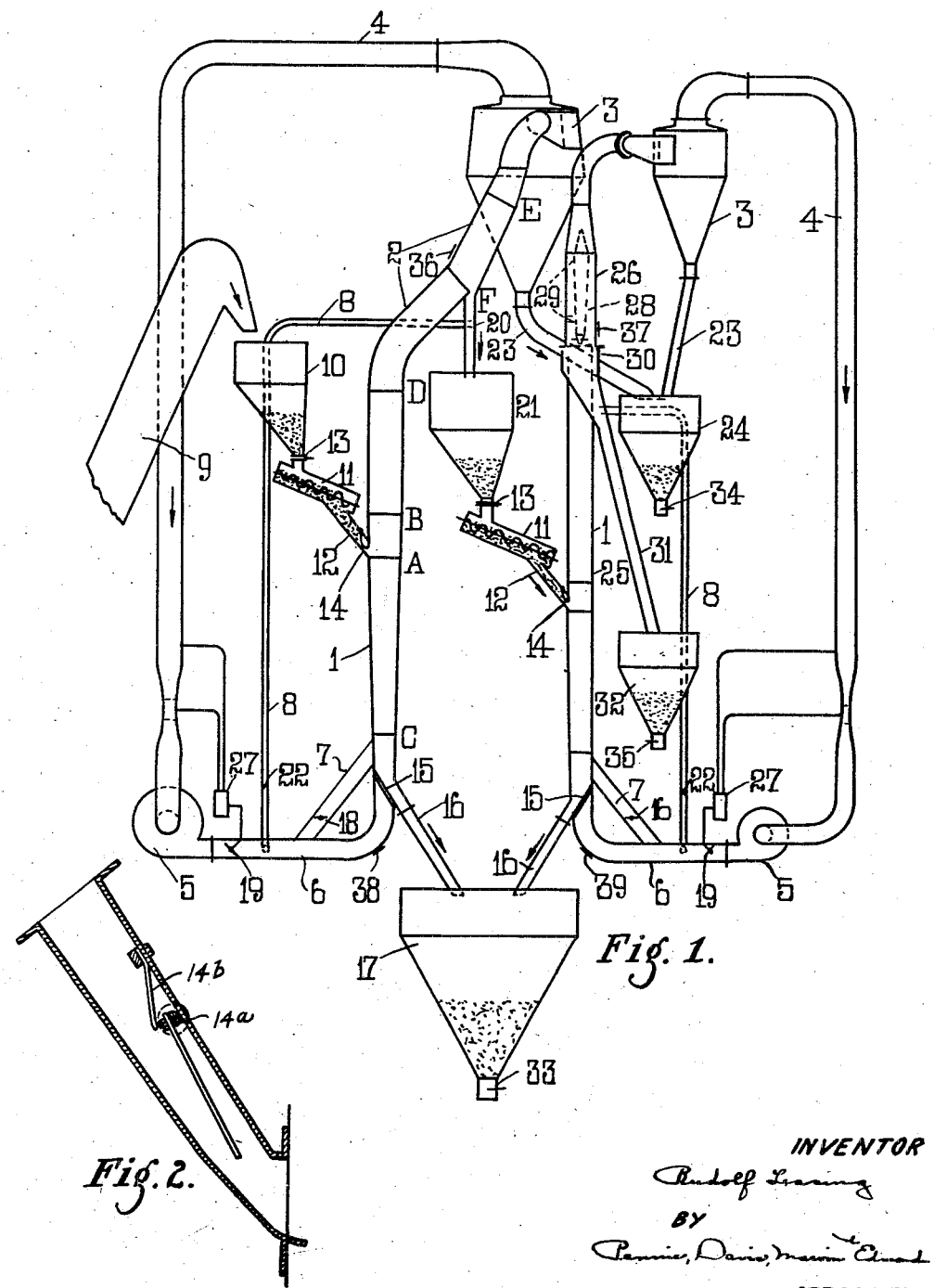

March 22, 1932.   R. LESSING   1,850,756

SEPARATION OF POWDERED OR GRANULAR MATERIAL, ESPECIALLY COAL

Filed Dec. 22, 1927

INVENTOR
Rudolf Lessing
BY
Pennie, Davis, Marvin & Edmonds
ATTORNEYS

Patented Mar. 22, 1932

1,850,756

UNITED STATES PATENT OFFICE

RUDOLF LESSING, OF LONDON, ENGLAND

SEPARATION OF POWDERED OR GRANULAR MATERIAL, ESPECIALLY COAL

Application filed December 22, 1927, Serial No. 241,741, and in Great Britain January 11, 1927.

This invention relates to improvements in and relating to the separation of powdered granular mineral material, whether natural, as in the case of coal, or artificial, as in the case of certain pigments or other inorganic substances. The object of the invention is to enable a mixture of coarse and fine particles to be separated into two or more grades within desired limits of size.

The invention is particularly applicable to the treatment of coal.

Thus it is very suitable for the treatment of coal slack or duff so as to separate all or substantially all the coal free or substantially free from dust.

In one feature of the present invention the material is fed to a tubular member, gas is supplied at a point below the point of feed of the said material, the finer constituents carried upwards by the gas current are separated and withdrawn at a point above said point of feed from the upflowing gas current and the coarser constituents falling against the gas current are withdrawn at a point below the point of feed.

Thus the coal or other mineral in a suitable divided form is caused to pass in a downward direction against an upflowing stream of gas, the coarser constituent which falls against the gas stream are withdrawn at a lower point with little or none of the finer constituent which is carried upwards by the gas current is removed from the upflowing gas current at a higher point. Preferably the mineral is fed into a tubular vessel up which the current of gas is flowing, the coarser constituent is withdrawn at an outlet at the bottom of the vessel and the finer constituent is carried up by the gas current and is separated therefrom at one or more points, so as to yield a coarse constituent containing little or no fine material and a fine constituent containing little or no coarse material.

Preferably the material carried upwards by the gas current is allowed to separte therefrom at two or more points so as to segregate several grades of material. This segregation may be suitably effected by reducing the velocity of the gas current at one or more points and providing means to draw off the deposited material at these points. The residual fine material carried by the gas may finally be separated by means of a cyclone separator and/or other suitable devices for removing dust from the gas.

Preferably the gas is caused to travel in a long and straight upward path so as to avoid eddy currents as far as possible and so as to give the coal to be treated a sufficient length of travel in contact with the gas for effective carrying upwards of the finer constituents, and effective separation of the coarser constituents therefrom. Thus the upward gas current preferably moves as nearly as possible at the same speed over the whole internal cross section of the vessel in a direction perpendicular to that cross-section.

To increase the effective length of travel without unduly enlarging the apparatus the tubular vessel employed may be of helical form although in the preferred form of apparatus which is described hereinafter a straight tubular vessel is employed.

The invention includes apparatus suitable for carrying out the process of the present invention comprising essentially a separator in the form of a substantially vertical tubular member having a port at its lower end of the removal of coarse material, a port near its lower end for the supply of gas, a port at a higher level for the supply of material to be separated, and an upwardly extending tube at its upper end with a port for removal of finer constituents. Preferably it is connected at its upper end to an analyzer in the form of another upwardly extending tubular member provided with a port or ports for the removal of material settling out from the upflowing gas stream. The analyzer tube may be inclined if desired and may be tapered or may be enlarged at one or more points to facilitate the separation of "middlings". These "middlings" will consist in general of material of a size intermediate between that of the coarse material removed from the bottom of the separator and the dust carried through the analyzer by the gas.

The middlings will usually contain particles of different sizes and may further be resolved by subsequent treatment in the same or a similar unit. An important feature of the present invention consists in combining two units in one apparatus so that the second unit employs as raw material the middlings delivered by the first apparatus.

The dust still carried by the gas after removal of the middlings may be removed by a cyclone or other separator connected to the upper end of the analyzer.

The invention will now be described more particularly with respect to the separation of coal into coarser and finer constituents. Coal is often treated for the removal of products containing a high content of ash-forming ingredients. In the wet method of treatment drainage is impeded by the presence of dust which moreover is apt to form undesirable slurry or slimes. In the dry method also the fine constituents cause inconvenience. It is therefore necessary, in coal cleaning or separating processes, to employ a coal which contains but little fine dust, which may be defined by way of example as material passing a 50 mesh sieve.

In the accompanying drawings Figure 1 shows a diagrammatic elevation of an apparatus suitable for carrying out the present invention. This apparatus consists of two units, the left hand unit comprising the main separator while the right hand unit comprises the secondary separator for the treatment of middlings from the main separator.

Figure 2 is an elevation of the coal inlet.

In the drawings, 1 is the separator tube proper of the main separator. From the level A to the level B it is of circular section. From the level A it tapers downwardly and converges to a square section at the level C. From the level B upwardly there is little or no taper but the tube merges into a rectangular section at the level D. 2 is the analyzer tube which is of rectangular section to the level E. 3 is a cyclone separator, 4 the air return pipe, 5 an air blower and 6 a square sectioned air pipe connecting the blower to the bottom of the separator tube 1. 7 and 8 are bye-pass pipes for purposes to be hereinafter described.

The analyzer tube is designed to analyze the finer constituents of the coal into two or more grades. These finer constituents which have been separated from the coarser constituents in the separator tube 1 are carried upwards through the analyzer tube 2 by the gas current as hereinafter described. While the gas current is still passing upwards through the analyzer tube the finer constituents are allowed to separate therefrom and are withdrawn through suitable outlets while the dust passes on with the gas current. These finer particles, intermediate between the coarse constituents and the dust are referred to as "middlings". The separation of the middlings is secured by reducing the velocity of the gas current at one or more points in the analyzer tube.

In operation coal is supplied from an elevator 9 to a bunker 10. Thence it passes through a worm feed 11 to the supply tube 12. A valve 13 is provided to shut off the supply of coal as required. A hinged and weighted shoulder plate 14 shown in detail in Figure 2 automatically regulates the delivery from the tube 12. The worm feed 11 effectively prevents escape of air from the separator tube 1 although other known feed devices may be employed with this object in view as shown in Figure 2 the plate 14 is secured to a boss 14a which pivots on the wall of the tube 12 and is shrouded by a shield 14b.

The coal on entering the separator tube 1 about the level A is met by an upflowing air current of suitable velocity which must be determined according to the dimensions of the apparatus, the nature of the material to be treated and the degree of separation required. The coarser constituent falls against the air stream on to the sloping grid 15 by which it is guided into the outlet pipe 16 whence it passes to the sealed bunker 17. A current of air from the tube 6 passes through the coarse constituent on the grid 15. The main supply of air is provided through the bye-pass 7. Valves 18 and 19 are provided to control the volume rate of the air.

The finer constituents which are carried upwards by the air current from the level A, pass into the analyzer tube 2. The cross section at F is enlarged to facilitate separation of middlings from the air stream but the portion F to E tapers somewhat to prevent undue separation of dust. The middlings collect on the lower wall between the levels E and F and pass down the middlings outlet tube 20 to a sealed bunker 21. The middlings while in the tube 20 are subjected to a supplementary gas current formed by a stream of air from the bye-pass 8 controlled by valve 22 in order to remove dust remaining in the middlings. The air carrying the dust passes on to the cyclone separator 3 the separated dust being removed therefrom through the tube 23 to the sealed bunker 24 while the air passes out through the pipe 4.

The pipe 4 is provided with a flow actuated device 27 of known construction which controls the movement of the valve 19 in the pipe 6 by allowing the variations in pressure difference between two selected points in air pipe 4, caused by variations in the volume flow of the air, to operate on a relay which transmits opening or closing movements to the valve 19 by any known means, in order to obtain automatic regulation of the volume flow of air. Thus an increase in the volume flow of air would cause an increase in the pressure difference mentioned and the relay would be so affected that it would tend to close the valve 19, thereby reducing the rate of flow of air to its correct value. Similarly, a reduction in the rate of flow would reduce the differential pressure so that the velocity tends to open the valve.

Middlings collecting in the bunker 21 are subjected to further separation in the right hand unit. As shown in the drawings the worm feed 11, supply tube 12, valve 13 and shoulder plate 14 are of similar construction to the correspondingly numbered parts of the left hand separator. The separator tube 25 and analyzer tube 26 function in similar manner to the separator tube 1 and analyzer tube 2 of the left hand unit but are of modified construction as shown and described hereinafter.

The middlings from the bunker 21 enter the separator tube 25 and are subjected to the upflowing current of air from the pipe 7 as before. The coarser constituent falls and passes over the grid 15 through the tube 16 into the sealed bunker 17.

The air carrying the finer constituents passes up the separator tube which in this case is of circular cross-section over the whole of its length. The analyzer tube 26 mounted above and connected to the separator tube 25 and is of wider cross section but contains a member 28 supported in the tube 26 by spiders 29 to form an annular path. The separated second middlings are collected in a launder 30 whence they pass by the tube 31 to a sealed bunker 32. The launder 30 forms a downward extension of the analyzer tube 26. The separator tube extends upwards within the launder 30 as shown to a point short of the lower end of the analyzer tube 26. In the tube 31 the second middlings are subjected as in the case of the original middlings to a current of gas from a bye-pass 8 controlled by valve 22 to remove any remaining dust. The air as before is passed through a cyclone separator 3 whence the dust passes by tube 23 to the sealed bunker 24. The air is returned by the tube 4 and blower 5, as before.

The bunkers 17, 24 and 32 are provided with valves 33, 34, and 35 to enable the coal to be removed as required while preventing escape of air. Inspection doors 36, 37, 38 and 39 may be provided.

The apparatus described above is one preferred form and many variations may be made in construction and arrangement within the scope of the present invention. Thus in some cases it may be desirable to provide for the removal of two or more grades of middlings from one analyzer tube by the provision of a corresponding number of outlet tubes. In such case it may not be necessary to subject such middlings to a further process of separation.

The provision of an automatic flow controlling device for the air is important because the coal which is applied to the system occupies a portion of the volume and thus variations in the feed of coal may cause variations in the velocity of flow of the air. These variations in velocity of flow may interfere with the sharp separation of the coarser and finer constituents. With too low a velocity of flow the finer constituent will contain very little or none of the coarser constituent but the coarser constituent may contain a small proportion of the finer. With too high a velocity of flow, on the other hand, the coarser constituent will contain very little or none of the finer constituent (e. g. less than 1% of material passing a 50 mesh sieve), but the finer constituent may contain a small proportion of the coarser.

The moisture content of the initial material appears to be an important consideration. It would appear that for successful separation of coal the initial material should contain not more than about 2% of moisture although the figures depend somewhat upon the nature of the coal employed. By moisture content is meant here simply the moisture removable by air drying and not that known as "inherent moisture."

The presence of a proportion of moisture in the coal tends to give a separation in which the coarse constituent contains an undue proportion of fines. This may, however, be corrected by employing a gas current of higher velocity. This produces a good quality coarse constituent but results in the separation of a finer constituent containing an undue proportion of coarse. This finer constituent may then be dried e. g. in an oven and re-treated in the same or similar separating apparatus employing a gas current of lower velocity for the separation of a fine material free or substantially free from coarse. Alternatively the whole of the coal may be dried or treated to reduce its moisture content, but the above described method, in which the coal is preliminarily separated and only the finer constituent dried, involves the drying of a much smaller bulk of material.

This invention is particularly suitable for the treatment of coal, but can also be utilized for the treatment of other mineral substances, either natural or manufactured such as ores, pigments and the like which require a separation into their coarser and finer constituents.

I declare that what I claim is:—

1. Apparatus for separating discrete particles of mineral material into coarser and finer constituents having a separator in the form of a substantially vertical tubular member tapering in the downward direction, a port at the lower end of said separator for removal of coarse material, a port near the lower end of said separator for the supply of gas, a port at a higher level of said separator for the supply of material to be treated, an analyzer in the form of another upwardly directed tubular member surmounting said separator and communicating therewith, a port on said analyzer for the withdrawal of finer constituents and an inlet adjacent said port for supply of a supplementary current of gas through said finer constituents to remove dust therefrom.

2. Apparatus for separating discrete particles of mineral material into coarser and finer constituents having a separator in the form of a substantially vertical tubular member, a grid at the lower end of said separator, a port adjacent said grid for removal of coarse material, a port above said grid for the supply of gas for separating said particles, a port below said grid from the supply of a supplementary gas current for removal of finer particles from said coarser constituents falling on said grid, a port at a higher level than the gas supply port for the supply of material to be treated, an analyzer in the form of another upwardly directed tubular member surmounting said separator and communicating therewith, and a port on said analyzer for the withdrawal of finer constituents.

3. Apparatus for separating discrete particles of mineral material into coarser and finer constituents having a separator in the form of a substantially vertical tubular member tapering in the downward direction, a port at the lower end of said separator for removal of coarse material, a port near the lower end of said separator for the supply of gas, a port at a higher level of said separator for the supply of material to be treated, an analyzer in the form of another upwardly directed tubular member surmounting said separator and communicating therewith, take off means on said analyzer for the withdrawal of finer constituents separating from the upflowing gas current and inlets adjacent said take off means for supply of a supplementary current of gas through said finer constituents to remove dust therefrom.

4. Apparatus for separating discrete particles of mineral material into coarser and finer constituents having a separator in the form of a substantially vertical tubular member tapering in the downward direction, a port at the lower end of said separator for removal of coarse material, a port near the lower end of said separator for the supply of gas, a port at a higher level of said separator for the supply of material to be treated, an analyzer in the form of another upwardly directed tubular member surmounting said separator and communicating therewith, means to cause solid particles carried by said gas to move in proximity to the wall of a port on said wall to enable finer constituents to be removed by falling against a still upflowing current of gas and an inlet adjacent said port for supply of a supplementary current of gas through said finer constituents to remove dust therefrom.

5. Apparatus for separating discrete particles of mineral material into coarser and finer constituents having a separator in the form of a substantially vertical tubular member, a port at the lower end of said separator for the removal of coarse material, a port near the lower end of said separator for the supply of gas, a port at a higher level of said separator for the supply of material to be treated, an analyzer in form of an inclined upwardly directed tubular member surmounting said separator and communicating therewith, and a port on the lower wall of said analyzer, and means for supplying an upflowing current of gas to said port.

6. Apparatus for separating discrete particles of mineral material into coarser and finer constituents having a separator in the form of a substantially vertical tubular analyzer, a port at the lower end of said separator for removal of coarse material, a port near the lower end of said separator for the supply of gas, a port at a higher level of said separator for the supply of material to be treated, an analyzer in the form of an inclined upwardly directed tubular member surmounting said separator and communicating therewith and of greater cross-section than said separator whereby the velocity of the gas current is reduced and the finer constituents carried up are caused to separate therefrom, take-off means on the lower wall of said analyzer for the withdrawal of such separated finer constituents, a dust separator connected to the upper end of said analyzer for the removal of remaining dust carried by the gas, a pipe conducting gas from said dust separator to an impeller, a supply pipe leading from said impeller to the gas supply port on said separator, and automatic control means on said supply pipe for regulating the velocity of gas supply.

In witness whereof, I have hereunto signed my name this 9th day of December, 1927.

RUDOLF LESSING.